(12) United States Patent
Uesugi et al.

(10) Patent No.: US 8,168,035 B2
(45) Date of Patent: May 1, 2012

(54) ADHESIVE METHOD OF PRESSURE-SENSITIVE ADHESIVE SHEET FOR VEHICLE COATINGS

(75) Inventors: Masanori Uesugi, Ibaraki (JP); Mitsuyoshi Shirai, Ibaraki (JP); Takashi Kondou, Ibaraki (JP); Masayuki Okamoto, Ibraki (JP); Masahito Niwa, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/450,987

(22) PCT Filed: Apr. 22, 2008

(86) PCT No.: PCT/JP2008/057719
§ 371 (c)(1),
(2), (4) Date: Oct. 21, 2009

(87) PCT Pub. No.: WO2008/136302
PCT Pub. Date: Nov. 13, 2008

(65) Prior Publication Data
US 2010/0116432 A1 May 13, 2010

(30) Foreign Application Priority Data
May 1, 2007 (JP) .................. 2007-120667

(51) Int. Cl.
*B32B 7/12* (2006.01)
(52) U.S. Cl. ......................... 156/327; 156/60
(58) Field of Classification Search .............. 156/327
See application file for complete search history.

(56) References Cited

U.S. PATENT DOCUMENTS

| 5,747,132 A | 5/1998 | Matsui et al. |
| 5,882,775 A | 3/1999 | Matsui et al. |
| 6,274,235 B1 * | 8/2001 | Ichimura et al. ............. 428/343 |
| 2002/0049293 A1 | 4/2002 | Uehara et al. |

FOREIGN PATENT DOCUMENTS

| JP | 2832565 | | 3/1994 |
| JP | 10-121007 A | | 5/1998 |
| JP | 10121007 A | * | 5/1998 |
| JP | 11-152452 A | | 6/1999 |
| JP | 2000-248241 A | | 9/2000 |
| JP | 2000-351952 A | | 12/2000 |
| JP | 2000351952 A | * | 12/2000 |
| JP | 2001-049200 A | | 2/2001 |
| JP | 2001246315 A | * | 9/2001 |
| JP | 2002-066206 A | | 3/2002 |
| JP | 2003-226834 A | | 8/2003 |

OTHER PUBLICATIONS

International Search Report mailed Jul. 22, 2008, issued on PCT/JP2008/057719.

\* cited by examiner

*Primary Examiner* — Philip Tucker
*Assistant Examiner* — Daniel Lee
(74) *Attorney, Agent, or Firm* — Edwards Wildman Palmer LLP; James E. Armstrong, IV; Junko Harada

(57) ABSTRACT

Provided is an adhesive method of pressure-sensitive adhesive sheet for vehicle coatings, giving a pressure-sensitive adhesive sheet highly adhesive even to a coating surface easily causing the low adhesion by bleed-out of leveling agent or the like.

The adhesive method of pressure-sensitive adhesive sheet for vehicle coatings according to the present invention is characterized in that the difference (absolute value) between the solubility parameter (SP value) of a pressure-sensitive adhesive layer (X) formed on the side of the pressure-sensitive adhesive sheet in contact with the vehicle coating and the solubility parameter (SP value) of the surface control agent contained in the vehicle coating is 0.6 $(cal/cm^3)^{1/2}$ or less.

8 Claims, No Drawings

ADHESIVE METHOD OF PRESSURE-SENSITIVE ADHESIVE SHEET FOR VEHICLE COATINGS

TECHNICAL FIELD

The present invention relates to an adhesive method of pressure-sensitive adhesive sheet for vehicle coatings such as automotive coating.

BACKGROUND ART

Pressure-sensitive adhesive tapes or sheets (hereinafter, the "tape or sheet" will be referred to collectively as "sheet") made of a foam as the base have been used for adhesion for example of molding or plate for protection and decoration of automotive exterior and body. Examples of the pressure-sensitive adhesive sheets for adhesion to the surface of vehicle coatings such as automotive coatings include pressure-sensitive adhesive sheets employing an acrylic adhesive and the like (see Patent Documents 1 and 2).

However, recently out of environmental consciousness, the base layer for the automotive coating has been shifting from a solvent-based coating to a water-based coating, and the amount of the surface control agent (leveling agent) added to the coating surface layer has been increased and the kind of the surface control agent has also changed (see Patent Documents 3 and 4). Under the influence of the change in automotive coating composition, there is a newly-emerging problem that conventional pressure-sensitive adhesive sheets do not have sufficiently high adhesive strength.

Patent Document 1: Japanese Unexamined Patent Publication No. 2001-49200
Patent Document 2: Japanese Unexamined Patent Publication No. 2000-248241
Patent Document 3: Japanese Unexamined Patent Publication No. 2002-66206
Patent Document 4: Japanese Unexamined Patent Publication No. 2003-226834

DISCLOSURE OF INVENTION

Problems to be Solved by the Invention

The inventors have found that the cause of the low adhesion is bleed out of the surface control agent added to automotive coatings for prevention of "repelling" during coating, on the coating surface with formation of a less cohesive layer thereon.

Accordingly, an object of the present invention is to provide an adhesive method of pressure-sensitive adhesive sheet that can provide the preferable adhesiveness to even an automotive coating (vehicle coating) in the state wherein the surface control agent is bleeding out, without deterioration in adhesive strength under the influence of the surface control agent.

Means to Solve the Problems

After intensive studies to achieve the object above, the inventors have found that it was possible to adhere a pressure-sensitive adhesive sheet with preferable adhesiveness without the influences from the surface control agent, by making the solubility parameter of the surface control agent contained in vehicle coating such as automotive coating have a particular relationship with the solubility parameter of the pressure-sensitive adhesive layer of pressure-sensitive adhesive sheet, and made the present invention.

Specifically, the present invention provides an adhesive method of pressure-sensitive adhesive sheet for vehicle coatings containing a surface control agent, characterized in that the difference (absolute value) between the solubility parameter (SP value) of an pressure-sensitive adhesive layer (X) formed on the side of the pressure-sensitive adhesive sheet in contact with the vehicle coating and the solubility parameter (SP value) of the surface control agent contained in the vehicle coating is 0.6 $(cal/cm^3)^{1/2}$ or less.

In addition, the present invention provides the adhesive method of pressure-sensitive adhesive sheet for vehicle coatings, wherein the pressure-sensitive adhesive sheet is an automotive coating-protecting sheet and the method is an automotive coating-protecting method.

Yet additionally, the present invention provides the adhesive method of pressure-sensitive adhesive sheet for vehicle coatings above, wherein the pressure-sensitive adhesive layer (X) is formed by curing an acrylic adhesive composition containing a vinyl monomer containing an alkyl (meth)acrylate (a1) having an alkyl group containing 2 to 14 carbon atoms as the principal component or the partial polymer thereof (a), a photopolymerization initiator (b), and a multifunctional (meth)acrylate (c) by irradiation with active-energy ray.

The present invention also provides the adhesive method of pressure-sensitive adhesive sheet for vehicle coatings above, wherein the pressure-sensitive adhesive sheet has a viscoelastic layer (Y) containing hollow microspheres.

The present invention also provides the adhesive method of pressure-sensitive adhesive sheet for vehicle coatings above, wherein the surface control agent is an acrylic oligomer having a number-average molecular weight of 4000 to 30000.

Effects of the Invention

The adhesive method of pressure-sensitive adhesive sheet for vehicle coatings according to the present invention in the configuration above gives, in particular, a pressure-sensitive adhesive sheet bonded preferably without deterioration in adhesive strength under the influence by the surface control agent, even to the hard-to-adhere coating surface containing a surface control agent in a relatively large amount on which the surface control agent is bleeding out. Accordingly, when a pressure-sensitive adhesive sheet is adhered by the method, it does not give troubles such as exfoliation during use, and thus, the method is useful for example for protection of the surface of automotive coatings.

BEST MODE FOR CARRYING OUT THE INVENTION

The present invention relates to an adhesive method of pressure-sensitive adhesive sheet for vehicle coatings (hereinafter, referred to simply as the "adhering method according to the present invention"). The "vehicle coating" in the present invention means a coating applied on the exterior of vehicles such as automobile, motorcycle body and railroad vehicle, and these vehicle coatings include those applied on exterior parts such as of automobiles, motorcycles and railroad vehicles. In the description below, "automotive coating" may be explained as the "vehicle coating".

The difference (absolute value) between the solubility parameter (SP value) of the pressure-sensitive adhesive layer of the pressure-sensitive adhesive sheet on the side in contact with the vehicle coating (e.g., automotive coating) (hereinafter, referred to "pressure-sensitive adhesive layer (X)") and the solubility parameter (SP value) of the surface control agent (also called "leveling agent") contained in the vehicle coating (e.g., automotive coating) is 0.6 $(cal/cm^3)^{1/2}$ or less, and more preferably 0.55 $(cal/cm^3)^{1/2}$ or less. A difference in the solubility parameter (absolute value) of more than 0.6 $(cal/cm^3)^{1/2}$ leads to decreased adhesiveness to the vehicle coating (automotive coating) surface with bleed-out of the surface control agent.

The solubility parameter (SP value) is a parameter indicating the solubility of a compound that is calculated from the basic structure of the compound, as proposed by Fedors, and specifically, it is calculated from $\Delta e$ (energy of vaporization of each atom or atom group) and $\Delta v$ (molar volume of each atom or atom group) according to the following Formula (see Hideki Yamamoto, "SP values, Basis, Application and Calculation Method", 4th Ed., Joho Kikoh Co., Ltd., Apr. 3, 2006, pp. 66-67). The SP value of the surface control agent is a value determined after curing of the coating, and is calculated from the results of chemical composition analysis (NMR) of the sample obtained by drying the dilute solution.

$$SP\ value(\delta) = (\Sigma \Delta e / \Sigma \Delta v)^{1/2}$$

Generally for improvement in tackiness of a pressure-sensitive adhesive sheet to vehicle coatings (e.g., automotive coatings), the solubility parameter of the vehicle coating itself and the solubility parameter of the pressure-sensitive adhesive layer of pressure-sensitive adhesive sheet are made closer to each other. However, in this case, the pressure-sensitive adhesive sheet may be preferably tacky to coatings containing a conventional surface control agent only in a small amount, but it is not sufficiently adhesive to coatings containing a surface control agent in a relatively large amount under the influence of deterioration in adhesive strength caused by the surface control agent. The "adhesiveness" does not necessarily mean the absolute magnitude of adhesive strength and includes the property resistant to the change in adhesiveness (e.g., change by bleeding) under the influence of the surface control agent. It is probably because, in the case of a coating containing a surface agent in a relatively large amount, the surface control agent contained in the coating bleeds out on the coating surface, forming a hardly adhesive layer lower in cohesive force. It is estimated in the present invention that it was possible to reduce the influence by the surface control agent and improve affinity to vehicle coatings and the adhesiveness between them, by making the solubility parameter of the pressure-sensitive adhesive layer of pressure-sensitive adhesive sheet closer to that of the surface control agent.

The adhesion method according to the present invention can be used as a method of protecting automotive coating by using a pressure-sensitive adhesive sheet as automotive coating-protecting sheet. Alternatively, a decorated sheet may be used as the pressure-sensitive adhesive sheet for decoration of automobiles. Yet alternatively, a double-faced pressure-sensitive adhesive sheet may be used for adhesion to molding, plate or the like, for protection or decoration of automobile exteriors and bodies. It can also be used for sun roof, pillar garnish, and others.

[Vehicle Coating (Automotive Coating)]

As used in the adhering method according to the present invention, the vehicle coating (typically, automotive coating) to be bonded with a pressure-sensitive adhesive sheet contains a surface control agent. In the case of a coating containing no surface control agent, there is no advantageous effect of the present invention obtained. Common automotive coatings have for example a configuration of electrodeposition (undercoat) coating/middle-coat coating/top-coat base coating/top-coat clear coating, but the coating for use in the present invention at least contains a surface control agent, in an intermediate-coat coating, a top-coat base coating and a top-coat clear coating. In particular, when the middle-coat coating and the top-coat base coating are aqueous coatings, it is needed to add a large amount of a surface control agent to the middle-coat coating and the top-coat base coating for preservation of preferable coating efficiency of the clear coating, and thus, the surface control agent bleeds out easily on the coating surface and the advantageous effects of the present invention are exhibited distinctively.

The top-coat clear coating in the automotive coating is not particularly limited, and examples thereof include various coatings such as of polyester-melamine-based resins, alkyd-melamine-based resins, acrylic-melamine-based resins, acryl-urethane-based resins, and acrylic-polyacid-curing agents. In particular, the adhering method according to the present invention is particularly effective when the top-coat clear coating is an acrylic-polyacid curing agent-based clear coatings.

The surface control agent is an additive for controlling the surface defect of coating. It is particularly used for defoaming and for improvement in leveling efficiency. The surface control agent is not particularly limited, and examples thereof include acrylic, vinyl, silicone-based, fluorine-based and other surface control agents, but particularly preferable are surface control agents of acrylic oligomers having a number average molecular weight of 4000 to 30000 (more preferably, 4000 to 20000), and more specifically, acrylic oligomers (homopolymers or copolymers) containing at least one acrylate selected from 2-ethylhexyl acrylate, butyl acrylate, and ethyl acrylate as the monomer component and the like. Examples of commercially available surface control agents include DISPARLON LF-1900 series products (manufactured by Kusumoto Chemicals, Ltd.), POLYFLOW series products (manufactured by Kyoeisha Chemical Co., Ltd.) and the like.

The content of the surface control agent in the entire vehicle coating (automotive coating) is not particularly limited, but preferably 0.01 to 5 wt %, and more preferably 0.02 to 3 wt %. A surface control agent content of less than 0.01 wt % leads to decrease of the advantageous effects by using the adhesion method according to the present invention.

The solubility parameter of the surface control agent is not particularly limited, but, for example if the surface control agent is an acrylic surface control agent, it is approximately 9.2 to 9.8 $(cal/cm^3)^{1/2}$.

[Pressure-Sensitive Adhesive Sheet]

The pressure-sensitive adhesive sheet used in the adhesion method according to the present invention is a pressure-sensitive adhesive sheet at least having a pressure-sensitive adhesive layer (X) satisfying the requirement in solubility parameter described above.

The adhesive constituting the pressure-sensitive adhesive layer (X) is not particularly limited in kind, if the solubility parameter thereof satisfied the requirement above, and for example, any adhesive, such as a rubber-based adhesive (natural or synthetic rubber-based adhesive such as styrene-butadiene copolymer-based, polyisobutylene-based, or styrene-isoprene-styrene copolymer-based adhesive) or an acrylic adhesive may be used. Acrylic adhesives are particularly preferable among the adhesives above, for example from the viewpoint of adhesive power.

The acrylic adhesive (acrylic adhesive composition) generally contains a vinyl monomer containing an alkyl (meth) acrylate (a1) having an alkyl group containing 2 to 14 carbon atoms as the principal component or the partial polymer thereof (a) (hereinafter, referred to as "component (a)") as a constituent component. As used in the present invention, the term "(meth)acrylic" means "acrylic and/or methacrylic", and relative terms also have similar meanings. Alternatively, the "acrylic adhesive composition" means a composition forming an acrylic adhesive, but may be used synonymously with the acrylic adhesive.

Also in the present invention, the "principal component" means a component that is contained in an amount of 60 wt % or more (60 to 100 wt %), preferably 65 wt % or more, with respect to the sum of all components, unless otherwise specified.

The acrylic adhesive composition according to the present invention is preferably cured by irradiation with active energy ray, and more preferably with ultraviolet ray, although the curing method is not particularly limited thereto.

The component (a) used in the acrylic adhesive composition is an adhesive component mainly responsible for tackiness, such as a vinyl monomer or its partial polymer. The vinyl monomer for use as component (a) contains an alkyl (meth)acrylate (a1) having an alkyl group (including cycloalkyl group) containing 2 to 14 carbon atoms (hereinafter, referred to simply as "monomer (a1)") as the principal component. The vinyl monomer may contain only one monomer (a1) or may be a mixture of multiple monomers (a1) or a mixture of a monomer (a1) and other copolymerizable monomer (a2). Alternatively, the component (a) may be a partial polymer of the vinyl monomer mixture obtained by preliminary polymerization. The "partial polymer" is the partial polymerization product of a vinyl monomer mixture, and specifically, a low-molecular weight polymer having a vinyl monomer as the monomer component or a mixture of the polymer and the unreacted vinyl monomer.

The alkyl (meth)acrylate (a1) for use as the vinyl monomer is a (meth)acrylic alkyl ester having a straight-chain, branched-chain or cyclic alkyl group containing 2 to 14 carbon atoms. In particular, the number of carbons is preferably 2 to 10, from the viewpoint of adhesiveness. Examples of the (meth)acrylic alkyl ester monomers (a1) include ethyl (meth)acrylate, n-propyl (meth)acrylate, isopropyl (meth)acrylate, n-butyl (meth)acrylate, sec-butyl (meth)acrylate, t-butyl (meth)acrylate, n-octyl (meth)acrylate, isooctyl (meth)acrylate, 2-ethylhexyl (meth)acrylate, isononyl (meth)acrylate, dodecyl (meth)acrylate and the like. From the viewpoint of adhesiveness, 2-ethylhexyl acrylate and butyl acrylate are particularly preferable. These alkyl (meth)acrylates (a1) may be used alone or in combination of two or more.

Examples of the copolymerizable monomers (a2) that are used as the vinyl monomer of the present invention include carboxyl group-containing monomers such as acrylic acid, methacrylic acid, carboxyethyl acrylate, carboxypentyl acrylate, itaconic acid, maleic acid and crotonic acid; hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate and (4-hydroxymethylcyclohexyl)methyl acrylate; acid anhydride monomers such as maleic anhydride and itaconic anhydride; sulfonic acid group-containing monomers such as 2-acrylamido-2-methylpropanesulfonic acid, and sulfopropyl acrylate; phosphoric acid group-containing monomers such as 2-hydroxyethyl acryloyl phosphate; amide monomers such as (meth)acrylamide, N-substituted (meth)acrylamides (e.g., N-methylolacrylamide, N,N-diethylacrylamide, N,N-dimethylacrylamide, etc.); succinimide monomers such as N-(meth)acryloyloxymethylene succinimide, N-(meth)acryloyl-6-oxyhexamethylene succinimide, and N-(meth)acryloyl-8-oxyoctamethylene succinimide; and the like. Other copolymerizable monomers (a2) possibly used include vinyl monomers such as vinyl acetate, N-vinylpyrrolidone, N-vinylcarboxylic amide, styrene, and N-vinylcaprolactam; cyanoacrylate-based monomers such as acrylonitrile and methacrylonitrile; acrylic ester-based monomers such as glycidyl (meth)acrylate, tetrahydrofurfuryl (meth)acrylate, polyethylene glycol (meth)acrylate, fluorine (meth)acrylate, silicone (meth)acrylate, and 2-methoxyethyl acrylate; alkyl (meth)acrylates having an alkyl group different from the alkyl (meth)acrylates (a1) having an alkyl group containing 2 to 14 carbon atoms such as methyl (meth)acrylate and octadecyl (meth)acrylate; and the like. These copolymerizable monomers (a2) may be used alone or in combination of two or more.

Among the monomers above, carboxyl group-containing monomers and amide monomers for example are preferable, in particular, acrylic acid, N,N-diethylacrylamide and N,N-dimethylacrylamide are preferable, as copolymerizable monomers (a2), from the viewpoint of SP value control, adhesiveness and others. In addition, N-vinylpyrrolidone is also preferable.

If the alkyl (meth)acrylate (a1) and the copolymerizable monomer (a2) are used, the ratio of monomer (a1) to monomer (a2) may be altered properly, for example, according to the desired solubility parameter, but the mixture preferably contains the monomer (a1) at a rate of 60 to 99.9 wt % and the monomer (a2) at a rate of 0.1 to 40 wt %. More preferably, the monomer (a1) is used at a rate of 65 to 99 wt %, and the monomer (a2) at a rate of 1 to 35 wt %, and still more preferably, the monomer (a1) is used at a rate of 70 to 95 wt % and the monomer (a2) at a rate of 6 to 30 wt %.

The component (a) according to the present invention may be a partial polymer prepared by preliminary polymerization of the vinyl monomer mixture from viewpoint of adjusting the viscosity of the acrylic adhesive composition. The partial polymerization is normally carried out by irradiation of active energy ray (in particular, ultraviolet ray) in the absence of oxygen.

When the component (a) according to the present invention is a partial polymer of vinyl monomer mixture, the polymerization rate varies, for example, according to the molecular weight of the polymer contained and is not particularly limited, but it is approximately 2 to 40 wt %, preferably approximately 5 to 35 wt %. The polymerization rate of the partial polymer was determined by weighing approximately 0.5 g of the partial polymer accurately and additionally weighing the dried polymer after storage at 130° C. for 2 hours, thus giving the weight loss [volatile material (unreacted monomer weight)], and substituting the numerical value obtained into the following Formula:

Polymerization rate of partial polymer(%)=[1−(Weight loss)/(Weight of partial polymer before drying)]×100

The glass transition temperature (Tg) of the component (a) according to the present invention is preferably −70 to −30° C., and more preferably −60 to −30° C., from the viewpoint of adhesiveness.

When the acrylic adhesive composition according to the present invention is an active energy ray curable (e.g., ultraviolet curable) adhesive composition, an active energy ray polymerization initiator (b) (hereinafter, referred to as "photopolymerization initiator (b)") is preferably added to the acrylic adhesive composition. The photopolymerization initiator (b) is not particularly limited, and examples thereof include benzoin ethers such as benzoin methylether, benzoin propylether, and 2,2-dimethoxy-1,2-diphenylethan-1-one; substituted benzoin ethers such as anisole methylether; substituted acetophenones such as 2,2-diethoxyacetophenone, 2,2-dimethoxy-2-phenylacetophenone, and 1-hydroxy-cyclohexyl-phenylketone; substituted-α-ketols such as 2-methyl-2-hydroxypropiophenone; aromatic sulfonyl chlorides such as 2-naphthalenesulfonyl chloride; photoactive oximes such as 1-phenyl-1,1-propandione-2-(o-ethoxycarbonyl)-oxime, and the like.

The amount of the photopolymerization initiator (b) used is preferably 0.01 to 5 wt parts, and more preferably 0.1 to 3 wt parts, with respect to 100 wt parts of the component (a).

The acrylic adhesive composition preferably contains a multifunctional (meth)acrylate (c) added thereto, for providing the adhesive with suitable gel fraction. The multifunctional (meth)acrylate (c) for use is, for example, a compound containing at least two (meth)acryloyl groups and is not particularly limited, and examples thereof include trimethylolpropane tri(meth)acrylate, pentaerythritol tetra(meth)acrylate, 1,2-ethylene glycol di(meth)acrylate, 1,6-hexanediol di(meth)acrylate, 1,12-dodecanediol di(meth)acrylate and the like. These multifunctional (meth)acrylates (c) may be used alone or in combination of two or more.

The amount of the multifunctional (meth)acrylate (c) used may vary according to the molecular weight and the number of its functional groups, but is preferably 0.001 to 10 wt parts, and more preferably 0.05 to 5 wt parts, with respect to 100 wt parts of the component (a).

The acrylic adhesive composition may contain additives other than those above in the range that does not impair the advantageous effects of the present invention. Examples of the additives include tackifiers terpene resins (terpene resins, terpene phenol resins, aromatic modified terpene resins and hydrogenated terpene resins), petroleum resins (aliphatic, alicyclic and aromatic resins), rosin resins (rosin, hydrogenated rosin esters, etc.), coumarone-indene resins, styrenic resins), colorants such as pigments and fillers (e.g., calcium oxide, magnesium oxide, silica, zinc oxide, titanium oxide), crosslinking agents (e.g., isocyanate-based crosslinking agents, epoxy-based crosslinking agents, urea-based crosslinking agents, melamine-based crosslinking agents, and carboxylate acid anhydride-based crosslinking agents, metal compound-based crosslinking agents), flame retardants, aging inhibitors, antistatic agents, softening agents (e.g., process oils, petroleum softening agents), antioxidants, plasticizers, surfactants, foaming agents (heat-expandable microspheres and others) and the like.

The amount of the additives can be determined properly, for example, according to the desired solubility parameter and adhesive strength. For example, the amount of the crosslinking agent used is approximately 1 to 5 wt parts with respect to 100 wt parts of the acrylic-adhesive base polymer.

The thickness of the pressure-sensitive adhesive layer (X) according to the present invention in contact with the vehicle coating is not particularly limited, but preferably 10 μm or more (e.g., 10 to 400 μm), more preferably 20 μm or more, and more preferably 30 μm or more for preservation of its preferable adhesion strength.

The solubility parameter of the adhesive layer (X) according to the present invention in contact with the vehicle coating is not particularly limited, but, for example, approximately 9.2 to 9.8 $(cal/cm^3)^{1/2}$.

The method of forming the pressure-sensitive adhesive layer (X) according to the present invention may be any commonly known and used method of forming a pressure-sensitive adhesive layer and is not particularly limited, but preferably, for example, a method of forming a layer by coating an acrylic adhesive composition on a suitable substrate such as release film or base and curing the film by using active energy ray (in particular, ultraviolet ray). The layer-forming method may contain, as needed, a drying step. Since the photopolymerization reaction is inhibited by oxygen in air, it is preferable to block oxygen during curing with active energy ray (photocuring), for example, by adhering a release film onto the coated layer of the acrylic adhesive composition or by photocuring the film under nitrogen atmosphere.

Examples of the active energy rays include ionizing radiation rays such as α ray, β rays, γ ray, neutron beam and electron beam, ultraviolet ray and the like, and ultraviolet ray is particularly preferable. The irradiation energy and the exposure period of the active energy ray for example are not particularly limited, as long as the photopolymerization initiator can be activated for reaction of the monomer components. The irradiation intensity of the active energy ray is, for example, a ultraviolet intensity of approximately 400 to 4000 $mJ/cm^2$ corresponding to an illuminance of 1 to 200 $mW/cm^2$ at a wavelength of 300 to 400 nm.

In addition, the polymerization rate of the pressure-sensitive adhesive layer (X) is preferably 90 wt % or more during formation of the pressure-sensitive adhesive layer (X) by active energy ray irradiation of the acrylic adhesive composition. The unreacted monomers can be removed in a normal drying step. The polymerization rate of the pressure-sensitive adhesive layer (X) can be calculated according to a calculation method similar to that for the partial polymer described above.

The layer structure of the pressure-sensitive adhesive sheet used in the adhesion method according to the present invention is not particularly limited, but may be, for example, (1) a base-less pressure-sensitive adhesive sheet only having a pressure-sensitive adhesive layer (X); or (2) a pressure-sensitive adhesive sheet having a base and a pressure-sensitive adhesive layer (X) formed at least on one side thereof. The pressure-sensitive adhesive sheet may have the shape of double-faced pressure-sensitive adhesive sheet having pressure-sensitive adhesive layers on both faces or the shape of single-faced pressure-sensitive adhesive sheet having a pressure-sensitive adhesive layer only on one side. In particular, a base-less adhesive sheet or a double-faced pressure-sensitive adhesive sheet having pressure-sensitive adhesive layers on both surfaces of a base is preferable. When pressure-sensitive adhesive layers are formed on both surfaces of a base, at least one layer (on the side in contact with automotive coating) should be the pressure-sensitive adhesive layer (X), and the other layer may be a commonly known and used pressure-sensitive adhesive layer.

When the pressure-sensitive adhesive sheet has a base, the base is, for example, a plastic film such as of polyolefin (e.g., polypropylene), polyester (such as polyethylene terephthalate) or the like, a porous film for example having air permeability, a viscoelastic layer containing hollow microspheres (hereinafter, referred to as "viscoelastic layer (Y)"), paper, a cloth, a nonwoven fabric or a metal foil. In particular, a viscoelastic layer containing hollow microspheres is preferable as the base. The viscoelastic layer (Y), when formed on the side of the pressure-sensitive adhesive layer (X) not in contact with vehicle coating, increases adhesiveness, in particular adhesiveness to irregular-surfaced adherends (vehicle coatings). These bases may be used alone or in combination of two or more (e.g., base of a laminated film having a plastic film and a viscoelastic layer (Y)).

The pressure-sensitive adhesive layer (X), the viscoelastic layer (Y) or other base may have the shape of single layer or multi layers. The pressure-sensitive adhesive layer (X) may be laminated with the viscoelastic layer (Y) or other base directly or placing an intermediate layer such as adhesiveness layer therebetween. In addition, the pressure-sensitive adhesive layer may have other layers (e.g., undercoat layer) in the range that does not impair the advantageous effects of the invention. The pressure-sensitive adhesive sheet may have a release film (separator) placed on the adhesive face, for example for protection of the adhesive face, until it is used for adhesion.

The viscoelastic layer (Y) contains at least a base polymer and hollow microspheres constituting the viscoelastomer.

The base polymer used in the viscoelastic layer (Y) is not particularly limited and can be used properly as selected from known base polymers, and examples thereof include acrylic polymers, rubber-based polymers, vinyl alkylether-based polymers, silicone-based polymers, polyester-based polymers, polyamine-based polymers, urethane-based polymers, fluorine-based polymers, epoxy-based polymers and the like. Particularly in the present invention, acrylic polymers are used preferably among these base polymers, from the point of adhesiveness. These base polymers may be used alone or in combination of two or more.

The acrylic polymer above is a polymer having an alkyl (meth)acrylate containing a straight-chain or branched-chain alkyl group as the principal monomer component. Examples of the alkyl (meth)acrylate that is used as the principal monomer component for the acrylic polymer includes alkyl (meth)acrylate having an alkyl group containing 1 to 20 carbon atoms (preferably alkyl (meth)acrylates having an alkyl group containing 2 to 14 carbon atoms, more preferably alkyl (meth)acrylates having an alkyl group containing 2 to 10 carbon atoms), such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, isopentyl (meth)acrylate, hexyl (meth)acrylate, heptyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. These alkyl (meth)acrylates may be used alone or in combination of two or more.

(Meth)acrylates other than the alkyl (meth)acrylates having a straight-chain or branched-chain alkyl group, such as cycloalkyl (meth)acrylates having an alicyclic alkyl group, such as cyclopentyl (meth)acrylate, cyclohexyl (meth)acrylate, and isobonyl (meth)acrylate, may also be used as the monomer component.

The alkyl (meth)acrylate having a straight-chain or branched linear alkyl group, which is used as the principal monomer component or acrylic polymer, is preferably contained in an amount of 60 wt % or more, and more preferably 80 wt % or more, with respect to the total amount of the all monomer components constituting the acrylic polymer.

The acrylic polymer may contain various copolymerizable monomers such as polar group-containing monomers and polyfunctional monomers as monomer components. Use of a copolymerizable monomer as the monomer component improves properties of the viscoelastic layer (Y) such as elasticity and flexibility. The copolymerizable monomers may be used alone or in combination of two or more.

Examples of the polar group-containing monomers include carboxyl group-containing monomers such as (meth)acrylic acid, carboxyethyl (meth)acrylate, carboxypentyl (meth)acrylate, itaconic acid, maleic acid, fumaric acid, crotonic acid and isocrotonic acid or the anhydrides thereof (such as maleic anhydride); hydroxyl group-containing monomers such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)methyl acrylate; sulfonic acid group-containing monomers such as 2-acrylamido-2-methylpropanesulfonic acid and sulfopropyl acrylate; phosphoric acid group-containing monomers such as 2-hydroxyethyl acryloyl phosphate and the like. Other examples include amide group-containing monomers such as (meth)acrylamide, N,N-dimethyl(meth)acrylamide, N-methylol-(meth)acrylamide, N-methoxymethyl-(meth)acrylamide, and N-butoxymethyl-(meth)acrylamide; amino-group-containing monomers such as aminoethyl (meth)acrylate, dimethylaminoethyl (meth)acrylate, and t-butylaminoethyl (meth)acrylate; glycidyl group-containing monomers such as glycidyl (meth)acrylate and methylglycidyl (meth)acrylate; cyanoacrylate-based monomers such as acrylonitrile and methacrylonitrile; heterocyclic ring-containing vinyl monomers such as N-vinyl-2-pyrrolidone, (meth)acryloylmorpholine, N-vinylpyridine, N-vinylpiperidone, N-vinylpyrimidine, N-vinylpiperazine, N-vinylpyrazine, N-vinylpyrrole, N-vinylimidazole, and N-vinyloxazole; and the like. Among them, the polar group-containing monomer is preferably a carboxyl group-containing monomer such as acrylic acid or methacrylic acid or the anhydride thereof. Such polar group-containing monomers may be used alone or in combination of two or more.

The amount of the polar group-containing monomer used is preferably 40 wt % or less (e.g., 0.1 to 40 wt %), more preferably 0.1 to 35 wt %, and still more preferably 1 to 35 wt %, with respect to the total amount of the monomer components constituting the acrylic polymer. A polar group-containing monomer content of more than 40 wt % leads, for example, to deterioration in flexibility of the viscoelastic layer (Y), possibly causing deterioration in adhesiveness of the pressure-sensitive adhesive sheet to irregular surfaced adherend (vehicle coating face). On the other hand, an excessively low polar group-containing monomer content (e.g., less than 0.1 wt % with respect to the total amount of the monomer components constituting the acrylic polymer) leads to deterioration in cohesive force of the viscoelastic layer (Y), possibly causing deterioration in holding capacity of the pressure-sensitive adhesive sheet (property of preserving adhesiveness to the adherend against external force) (e.g., troubles of the adherend such as mold and emblem falling down) and deterioration in processability during processing (e.g., cutoff or stamping) of the pressure-sensitive adhesive sheet.

Examples of the polyfunctional monomers include hexanediol di(meth)acrylate, (poly)ethylene glycol di(meth)acrylate, (poly)propylene glycol di(meth)acrylate, neopentylglycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylates, polyester acrylates, urethane acrylates, butanediol di(meth)acrylate and the like.

The amount of the polyfunctional monomer used is preferably 2 wt % or less (e.g., 0.01 to 2 wt %), and more preferably 0.02 to 1 wt %, with respect to the total amount of the monomer components constituting the acrylic polymer. A polyfunctional monomer content of more than 2 wt % may lead, for example, to deterioration in flexibility of the viscoelastic layer (Y), possibly causing deterioration in adhesiveness of the pressure-sensitive adhesive sheet to irregular surfaced adherends. On the other hand, an excessively low polyfunctional monomer content (e.g., less than 0.01 wt % with respect to the total amount of the monomer components constituting the acrylic polymer) may lead to deterioration in cohesive force of the viscoelastic layer (Y), generating a concern about deterioration in holding capacity of the pressure-sensitive adhesive sheet and also to deterioration in processability when the pressure-sensitive adhesive sheet is processed (e.g., cutoff or punching).

Examples of the copolymerizable monomers other than the polar group-containing monomers and the polyfunctional monomers above include vinyl esters such as vinyl acetate and vinyl propionate; aromatic vinyl compounds such as styrene and vinyltoluene; olefins or dienes such as ethylene, butadiene, isoprene and isobutylene; vinyl ethers such as vinyl alkylether; vinyl chloride; alkoxyalkyl (meth)acrylate-based monomers such as methoxyethyl (meth)acrylate and ethoxyethyl (meth)acrylate; sulfonic acid group-containing monomers such as sodium vinylsulfonate; phosphoric acid group-containing monomers such as 2-hydroxyethyl acryloylphosphate; imide group-containing monomers such as cyclohexylmaleimide and isopropylmaleimide; isocyanate group-containing monomers such as 2-methacryloyloxyethyl isocyanate; fluorine atom-containing (meth)acrylates; silicon atom-containing (meth)acrylates and the like.

The base polymer for the viscoelastic layer (Y) (in particular, acrylic polymer) can be prepared by a traditionally known polymerization method (e.g., solution polymerization, emulsion polymerization or bulky polymerization), but in particular, use of a polymerization method of carrying out curing under heat or active energy ray by using a polymerization initiator is preferable. It is possible, by using the curing reaction under heat or active energy ray, to form a viscoelastic layer (Y) by curing the resin composition constituting the viscoelastic layer (Y), while the hollow microspheres are kept in the shape as they are mixed. It is thus possible to form a structure in which the hollow microspheres are contained uniformly and reliably in the viscoelastic layer (Y).

The polymerization initiator is not particularly limited in kind, and for example, a thermal polymerization initiator or a photopolymerization initiator can be used, but a photopolymerization initiator is used more preferably particularly for shortening the polymerization period. These polymerization initiators may be used alone or in combination of two or more.

When the resin composition for forming the viscoelastic layer (Y) according to the present invention contains a photopolymerization initiator, the pressure-sensitive adhesive layer (X) and the viscoelastic layer (Y) can both be cured by irradiation of active energy ray, and thus, the pressure-sensitive adhesive layer (X) and the viscoelastic layer (Y) can be formed simultaneously in preparation of the pressure-sensitive adhesive sheet according to the present invention.

The photopolymerization initiator is not particularly limited, and, for example, a photopolymerization initiator similar to the photopolymerization initiator (b) described above may be used. The amount of the photopolymerization initiator used is not particularly limited, but for example preferably 0.01 to 5 wt parts, and more preferably 0.05 to 3 wt parts, with respect to 100 wt parts of all monomer components contained in the resin composition forming the viscoelastic layer (Y).

It is important to irradiate active energy ray in activating the photopolymerization initiator. Examples of the active energy rays include ionizing radiation rays such as α ray, β rays, γ ray, neutron beam and electron beam, ultraviolet ray and the like, and ultraviolet ray is particularly preferable. The irradiation energy and the exposure period of the active energy ray are not particularly limited, as long as the photopolymerization initiator can be activated for initiating the reaction of the monomer components.

Examples of the thermal polymerization initiators used when the resin composition for forming the viscoelastic layer (Y) according to the present invention contains a thermal polymerization initiator include azo-based thermal polymerization initiators such as 2,2'-azobisisobutylonitrile, 2,2'-azobis-2-methylbutylonitrile, dimethyl 2,2'-azobis(2-methylpropionate), 4,4'-azobis-4-cyanovalerianic acid, azobisisovaleronitrile, 2,2'-azobis(2-amidino propane) dihydrochloride, 2,2'-azobis[2-(5-methyl-2-imidazolin-2-yl)propane] dihydrochloride, 2,2'-azobis(2-methylpropionamidine) bisulfate salt, and 2,2'-azobis(N,N'-dimethyleneisobutylamidine) dihydrochloride; peroxide-based thermal polymerization initiators such as dibenzoyl peroxide and tert-butyl permaleate; redox-based thermal polymerization initiators, and the like.

The viscoelastic layer (Y) contains hollow microspheres. The hollow microspheres may be used only in one kind or in combination of two or more kinds.

The hollow microspheres for use are preferably inorganic or organic hollow microspheres. Specific examples of the hollow inorganic microspheres include hollow balloons of glass such as hollow glass balloons; hollow balloons of metal compound such as hollow alumina balloons; hollow balloon of ceramic such as hollow ceramic balloons, and the like. Examples of the hollow organic microspheres include hollow balloons of resin such as hollow acrylic balloons and hollow vinylidene chloride balloons, and the like.

Examples of the commercially available hollow glass balloons include "Glass Microballoon" (manufactured by Fuji Silysia Chemical Ltd.); "CEL-STAR Z-25", "CEL-STAR Z-27T", "CEL-STAR CZ-31T", "CEL-STAR Z-36", "CEL-STAR Z-39", "CEL-STAR "CEL-STAR SX-39", and "CEL-STAR PZ-6000" (manufactured by Tokai Kogyo Co., Ltd.); "Silax Fine Balloon" (manufactured by Fine Balloon Ltd.), and the like.

The particle diameter (average particle diameter) of the hollow microspheres is not particularly limited, but can be selected, for example, in the range of 1 to 500 μm (preferably 5 to 200 μm, and more preferably 10 to 100 μm).

The specific density of the hollow microspheres according to the present invention is not particularly limited, but can be selected, for example, in the range of 0.1 to 0.8 g/cm$^3$ (preferably 0.12 to 0.5 g/cm$^3$). A specific density of less than 0.1 g/cm$^3$ leads to floating of the hollow microspheres when they are blended with the composition constituting the viscoelastic layer (Y), making it difficult to disperse the microspheres uniformly, while a specific density of more than 0.8 g/cm$^3$ makes the product more expensive and higher in cost.

The amount of the hollow microspheres used is not particularly limited, and, for example, preferably 5 to 50 vol % (cubic %), more preferably 10 to 50 vol %, and still more preferably 15 to 40 vol % with respect to the total volume of the viscoelastic layer (Y). A hollow microsphere content of less than 5 vol % may leads to decrease of the advantageous effects obtained by adding the hollow microspheres, while a content of more than 50 vol % may lead to deterioration in adhesive power.

The viscoelastic layer (Y) may contain bubbles, in addition to the hollow microspheres, for improvement in cushioning property and adhesiveness.

When bubbles are contained in the viscoelastic layer (Y), the amount of the bubbles possibly mixed can be selected properly in the range that does not impair the preferable adhesion and other properties, but is, for example, preferably 5 to 50 vol %, more preferably 10 to 40 vol %, and still more preferably 12 to 30 vol %, with respect to the volume of the viscoelastic layer (Y). A bubble content of less than 5 vol % often leads to low relaxation of stress and also to deterioration in rebound resistance. Alternatively, a bubble content of more than 50 vol % may generate bubbles penetrating the viscoelastic layer (Y), possibly leading to deterioration in adhesiveness, excessive softening of the viscoelastic layer (Y) and deterioration in shearing force.

The bubbles mixed in the viscoelastic layer (Y) are desirably, fundamentally independent bubbles, but may be a mixture of independent bubbles and semi-independent bubbles. Such a bubble normally has a spherical shape, but may have an irregularly spherical shape. The average bubble diameter of the bubbles is not particularly limited, and can be selected, for example, in the range of 1 to 1000 µm (preferably 10 to 500 µm, more preferably 30 to 300 µm).

The gas component that forms the bubbles is not particularly limited, and various gases including inert gases such as nitrogen, carbon dioxide and argon and also air can be used. If polymerization reaction is carried out for example after gas mixing, it is important to use, as the bubble-forming gas component, a gas that does not inhibit the polymerization reaction after gas mixing. Among the gases above, nitrogen is preferable as the bubble-forming gas component because it does not inhibit the reaction and also it is inexpensive.

The viscoelastic layer (Y) preferably contains a fluorochemical surfactant, as blended in addition to the base polymer and the hollow microspheres. In particular, a fluorochemical surfactant containing an oxy $C_{2-3}$ alkylene group and a fluorinated hydrocarbon group in the molecule is used favorably. Use of the oxy $C_{2-3}$ alkylene group-containing fluorochemical surfactant reduces the adhesiveness and the friction resistance between the hollow microspheres and the polymer in the viscoelastic layer (Y), making the viscoelastic layer exhibit high stress-dispersing efficiency. Thus, the adhesiveness of the pressure-sensitive adhesive sheet is increased. In addition, presence of the fluorinated hydrocarbon group provides the composition with improved bubble-mixing efficiency and stability, when bubbles are mixed, in addition to the preferable effects above.

Among the fluorochemical surfactants above, nonionic surfactants are preferable from the viewpoint of dispersibility in the base polymer, although the surfactant is not particularly limited thereto. The fluorochemical surfactants may be used alone or in combination of two or more.

The oxy $C_{2-3}$ alkylene group is represented by Formula: —R—O— (wherein, R represents a straight-chain or branched-chain alkylene group having 2 or 3 carbon atoms). The oxy $C_{2-3}$ alkylene group may be either an alcohol in which the terminal oxygen atom is bonded to a hydrogen atom, an ether in which it is bonded to another hydrocarbon group, or an ester in which it is bonded to another hydrocarbon group via a carbonyl group. Alternatively, it may be a compound having such a structure in part of a cyclic structure such as cyclic ether or lactone. Specific examples thereof include oxyethylene group (—$CH_2CH_2O$—), oxypropylene group [—$CH_2CH(CH_3)O$—] and the like. The oxy $C_{2-3}$ alkylene group may contain only one kind of group or two or more of them.

The fluorinated hydrocarbon group is not particularly limited, but preferably a perfluoro group. The perfluoro group may be monovalent or polyvalent (bivalent or higher). The fluorinated hydrocarbon group may contain a double or triple bond and may have a straight-chain, branched or cyclic structure. The number of carbons in the fluorinated hydrocarbon group is not particularly limited, but 1 or more, preferably 3 to 30, and more preferably 4 to 20. These fluorinated hydrocarbon groups may be present alone or in combination of two or more in the surfactant molecule.

The fluorochemical surfactant is not particularly limited, and may be, for example, a copolymer containing an oxy $C_{2-3}$ alkylene group-containing monomer and a fluorinated hydrocarbon group-containing monomer as monomer components. Examples of the copolymers preferably used include block copolymers and graft copolymers.

Examples of the block copolymers (copolymers containing oxy $C_{2-3}$ alkylene groups and fluorinated hydrocarbon groups in the main chain) include polyoxyethylene perfluoroalkylethers, polyoxyethylene perfluoroalkylates, polyoxypropylene perfluoroalkylethers, polyoxyisopropylene perfluoroalkylethers, polyoxyethylene sorbitan perfluoroalkylates, polyoxyethylene polyoxypropylene block copolymer perfluoroalkylates, polyoxyethylene glycol perfluoroalkylates, and the like.

Copolymers containing at least a polyoxyalkylene group-containing vinyl compound and a fluorinated hydrocarbon group-containing vinyl compound as monomer components, in particular acrylic copolymers, are used preferably as the graft copolymers (copolymers containing oxy $C_{2-3}$ alkylene groups and fluorinated hydrocarbon groups on the side chains). Examples of the polyoxyalkylene group-containing vinyl compounds include polyoxyalkylene (meth)acrylates such as polyoxyethylene (meth)acrylate, polyoxypropylene (meth)acrylate, and polyoxyethylene polyoxypropylene (meth)acrylate. Examples of the fluorinated hydrocarbon group-containing vinyl compounds include perfluoroalkyl (meth)acrylates such as perfluorobutyl (meth) acrylate, perfluoroisobutyl (meth)acrylate and perfluoropentyl (meth)acrylate, and fluorinated hydrocarbon-containing (meth)acrylic esters.

The fluorochemical surfactant may have a structure having an alicyclic hydrocarbon group and an aromatic hydrocarbon group, in addition to the structures above, in the molecule, and may contain various functional groups such as carboxyl, sulfonic acid, cyano, amide and amino in the range that does not inhibit dispersion in base polymer. For example if the fluorochemical surfactant is a vinyl copolymer, a monomer component copolymerizable with a polyoxyalkylene group-containing vinyl compound and a fluorinated hydrocarbon group-containing vinyl compound may be used as the monomer component. These monomers may be used alone or in combination of two or more.

Examples of the preferable copolymerizable monomer components include (meth)acrylic $C_{1-20}$ alkyl esters such as undecyl (meth)acrylate and dodecyl (meth)acrylate; alicyclic hydrocarbon group-containing (meth)acrylic esters such as cyclopentyl (meth)acrylate; aromatic hydrocarbon group-containing (meth)acrylic esters such as phenyl (meth)acrylate, and the like. Other examples include carboxyl group-containing monomers such as maleic acid and crotonic acid; sulfonic acid group-containing monomers such as sodium vinylsulfonate; aromatic vinyl compounds such as styrene and vinyltoluene; olefins or dienes such as ethylene and butadiene; vinylethers such as vinyl alkylethers; amide group-containing monomers such as acrylamides; amino-group-containing monomers such as (meth)acryloylmorpholine; glycidyl group-containing monomers such as methyl glycidyl (meth)acrylate; isocyanate group-containing monomers such as 2-methacryloyloxyethyl isocyanate; and the like. Furthermore, copolymerizable polyfunctional monomers (multifunctional monomers) such as dipentaerythritol hexa(meth) acrylate and divinylbenzene may also be used.

The molecular weight of the fluorochemical surfactant is not particularly limited, but, a fluorochemical surfactant having a weight-average molecular weight of less than 20000 (e.g., 500 or more and less than 20000) very likely reduces the adhesiveness and the friction resistance between the base polymer and the hollow microspheres. Combined use of a fluorochemical surfactant having a weight-average molecular weight of 20000 or more (e.g., 20000 to 100000, preferably 22000 to 80000, and more preferably 24000 to 60000) improves bubble mixing efficiency and stability of the mixed bubbles, if bubbles are contained.

Specific examples of the fluorochemical surfactants having a weight-average molecular weight of less than 20000 (fluorochemical surfactants containing oxy $C_{2-3}$ alkylene groups and fluorinated hydrocarbon groups) include "FTERGENT 251" and "FTX-218" (manufactured by Neos Co., Ltd.), "MEGAFACE F-477" and "MEGAFACE F-470" (manufactured by Dainippon Ink and Chemicals, Inc.), "Surflon S-381, S-383, S-393, KH-20, and KH-40" (AGC Seimi Chemicals Co., Ltd.) and the like. Specific examples of the favorably-used fluorochemical surfactants having a weight-average molecular weight of 20000 or more (fluorochemical surfactants containing oxy $C_{2-3}$ alkylene groups and fluorinated hydrocarbon groups) include "EFTOP EF-352, EF-801" (manufactured by JEMCO Co., Ltd.), "Unidyne TG-656" (manufactured by DAIKIN INDUSTRIES ltd.) and the like.

The amount of the fluorochemical surfactant used (solid matter) is not particularly limited, but can be selected, for example, in the range of 0.01 to 5 wt parts (preferably 0.02 to 3 wt parts, and more preferably 0.03 wt part to 1 wt part) with respect to 100 wt parts of all monomer components constituting the base polymer in the resin composition forming the viscoelastic layer (Y) (in particular, all monomer components forming the acrylic polymer containing an alkyl (meth)acrylate as the principal monomer component). The fluorochemical surfactant at a content of less than 0.01 part may provide no additional advantageous effect on adhesiveness, while a content of more than 5 wt parts may lead to deterioration in adhesiveness.

The resin composition forming the viscoelastic layer (Y) may contain suitable additives according to application, in addition to the components above (fluorochemical surfactant, base polymer, hollow microspheres, polymerization initiator and the like). Examples of the additives include crosslinking agents (e.g., polyisocyanate-based crosslinking agents, silicone-based crosslinking agents, epoxy-based crosslinking agents, alkyletherified melamine-based crosslinking agents), tackifiers (e.g., rosin derivative resins, polyterpene resins, petroleum resins, oil-soluble phenol resins that are solid, semi-solid or liquid at room temperature), plasticizers, fillers, aging inhibitors, colorants (pigments and dyes), and the like. For example when the viscoelastic layer (Y) is formed by using a photopolymerization initiator, a pigment (coloring pigment) may be used for coloring in an amount that does not inhibit photopolymerization. When the viscoelastic layer (Y) is black in color, for example, carbon black may be used. The amount of the carbon black used as coloring pigment is preferably, for example, 0.15 wt part or less (e.g., 0.001 to 0.15 wt part), and more preferably 0.02 to 0.1 wt part with respect to 100 wt parts of all monomer components constituting base polymer in the resin composition forming the viscoelastic layer (Y), from viewpoints of color development and prevention of inhibition on photopolymerization reaction.

The resin composition forming the viscoelastic layer (Y) can be prepared by mixing monomer components (e.g., an alkyl (meth)acrylate and others) for forming the base polymer, a polymerization initiator, various additives and others by a known method. Part of the monomer components may be partially polymerized, as needed, for example for adjustment of viscosity. Specific examples of the procedures in the preparation method include the followings:

(i) Monomer components for forming the base polymer (e.g., an alkyl (meth)acrylate and other copolymerization monomers) and a polymerization initiator (e.g., photopolymerization initiator) are mixed, to give a monomer mixture.

(ii) The monomer mixture was subjected to a polymerization reaction according to the kind of the polymerization initiator used (e.g., by ultraviolet polymerization), allowing polymerization of only part of the monomer components to give a polymerized composition (sirup).

(iii) Subsequently, hollow microspheres and, as needed, a fluorochemical surfactant and other additives are blended with the sirup obtained.

(iv) If the viscoelastic layer (Y) desirably contains bubbles, bubbles are incorporated and mixed into the blend obtained in (iii) to give a resin composition forming the viscoelastic layer (Y).

The method of preparing the resin composition for forming the viscoelastic layer (Y) is not particularly limited thereto, and for example, in the preparation of sirup above, the fluorochemical surfactant and the hollow microspheres may be blended previously during monomer mixing.

If the viscoelastic layer (Y) desirably contains bubbles, bubbles are preferably blended as the final component into the resin composition forming the viscoelastic layer (Y) for reliable mixing of the bubbles in the viscoelastic layer (Y), for example as in the preparation method above. In addition, the viscosity of the blend before bubble mixing (e.g., the blend obtained in (iii)) is preferably raised for reliable mixing of the bubbles. The viscosity of the blend before bubble mixing is not particularly limited, but preferably, for example 5 to 50 Pa·s (BH viscometer, rotor: No. 5 rotor, rotational frequency: 10 rpm, measurement temperature: 30° C.), and more preferably 10 to 40 Pa·s. A viscosity of less than 5 Pa·s may result in coalescence and disappearance of the mixed bubbles in the system because of excessively low viscosity, while a viscosity of more than 50 Pa·s may result in difficulty in forming the viscoelastic layer (Y) by coating because of excessively high viscosity. The viscosity can be adjusted, for example, by a method of blending various polymer components such as acrylic rubber and thickener or by a method of polymerizing part of the monomer components for forming the base polymer.

The method of mixing bubbles in producing the resin composition for forming the viscoelastic layer (Y) is not particularly limited, and any known bubble mixing method may be used. An example of the apparatus is an apparatus equipped with a circular plate having a through-hole at the center, a stator having a number of small gears and another stator having gears facing each other, and a rotor having small gears similar to those of the stator, being placed on the circular plate. The blend for bubble mixing is fed into the space between the gears of stator and the gears of rotor in the apparatus; and a bubble-forming gas component (bubble-forming gas) is supplied through the through-hole, while the rotor is rotated at high speed, to give a resin composition in which the bubble-forming gas is finely dispersed and mixed.

For reduction or prevention of coalescence of bubbles, the operations from bubble mixing to formation of the viscoelastic layer (Y) are preferably carried out continuously as a series of steps.

The method of forming the viscoelastic layer (Y) is not particularly limited, and the layer can be prepared for example by applying the resin composition forming the viscoelastic layer (Y) on a suitable substrate such as release film or base, forming a resin composition layer, and curing and drying the layer, as needed, (for example, by heat or active energy ray irradiation). In particular, curing by irradiation of active energy ray is preferable, as described above.

The thickness of the viscoelastic layer (Y) is not particularly limited, but can be selected, for example, in the range of 200 to 5000 μm (preferably 300 to 4000 μm, and more preferably 400 to 3000 μm). A thickness of less than 200 μm may lead to deterioration in cushioning property and also in adhesiveness to curved or irregular surfaced object, while a thickness of more than 5000 μm leads to difficulty in producing a layer or sheet of uniform in thickness. The viscoelastic layer (Y) may be in any shape: single-layered or multi-layered.

EXAMPLES

Hereinafter, the present invention will be described more in detail with reference to Examples, but it should be understood that the present invention is not restricted by these Examples. "%" and "part" below mean those by weight.

(Preparation of Pressure-Sensitive Adhesive Sheet 1)

0.05 wt part of "Irgacure 651" (manufactured by Ciba Specialty Chemicals Corporation) and 0.05 wt part of "Irgacure 184" (manufactured by Ciba Specialty Chemicals Corporation) were blended as photopolymerization initiators with a monomer mixture containing 90 wt parts of 2-ethylhexyl acrylate and 10 wt parts of acrylic acid as monomer components; the mixture was irradiated with ultraviolet ray, until the viscosity (BH viscometer, No. 5 rotor, 10 rpm, temperature: 30° C.) reached approximately 15 Pa·s, to give a partial polymer (sirup A) which is partially polymerized.

0.08 wt part of hexanediol diacrylate was added to 100 wt parts of the partial polymer (sirup A) thus obtained, and the mixture was agitated uniformly to give an acrylic adhesive composition.

The acrylic adhesive composition was applied on a polyethylene terephthalate film having a thickness of 38 μm ("LUMIRROR S-10", manufactured by Toray Industries, Inc.) to a final thickness (adhesive thickness) of 60 μm, to give a coated film.

Subsequently, a polyethylene terephthalate film having a thickness of 38 μm that is release-coated on one side with silicone was placed on the coated layer, covering the coated layer with the release-coated face on the coated layer side for blockage of oxygen.

Ultraviolet ray was then irradiated on the top face of the sheet (release film side) from a black light lamp ("TOSHIBA FL15BLB", manufactured by Toshiba Corporation) for 180 seconds at an illuminance of 4 mW/cm$^2$ (as determined by using a UV Checker "UVR-T1", manufactured by Topcon Corporation, having a maximum sensitivity of approximately 350 nm). The sheet was heat-treated additionally in a drier at 130° C. for 3 minutes, and the residual monomers were removed by vaporization, forming a pressure-sensitive adhesive layer and thus giving a pressure-sensitive adhesive sheet 1.

(Preparation of Pressure-Sensitive Adhesive Sheet 2)

0.05 wt part of "Irgacure 651" (manufactured by Ciba Specialty Chemicals Corporation) and 0.05 wt part of "Irgacure 184" (manufactured by Ciba Specialty Chemicals Corporation) were blended as photopolymerization initiators with 100 wt parts of 2-ethylhexyl acrylate as monomer component; and the mixture was irradiated with ultraviolet ray until the viscosity (BH viscometer, No. 5 rotor, 10 rpm, temperature: 30° C.) reaches approximately 15 Pa·s to give a partial polymer (sirup B) which is partially polymerized.

0.08 wt part of hexanediol diacrylate was added to 100 wt parts of the partial polymer (sirup B) thus obtained, and the mixture was agitated uniformly to give an acrylic adhesive composition.

A pressure-sensitive adhesive sheet 2 was prepared in a manner similar to the pressure-sensitive adhesive sheet 1 by using the acrylic adhesive composition.

(Preparation of Pressure-Sensitive Adhesive Sheet 3)

0.05 wt part of "Irgacure 651" (manufactured by Ciba Specialty Chemicals Corporation) and 0.05 wt part of "Irgacure 184" (manufactured by Ciba Specialty Chemicals Corporation) were blended as photopolymerization initiators with a monomer mixture containing 70 wt parts of 2-ethylhexyl acrylate and 30 wt parts of diethylacrylamide as monomer components; the mixture was irradiated with ultraviolet ray until the viscosity (BH viscometer, No. 5 rotor, 10 rpm, temperature: 30° C.) reached approximately 15 Pa·s to give a partial polymer (sirup C) which is partially polymerized.

0.08 wt part of hexanediol diacrylate was added to 100 wt parts of the partial polymer (sirup C) thus obtained, and the mixture was agitated uniformly to give an acrylic adhesive composition.

A pressure-sensitive adhesive sheet 3 was prepared in a manner similar to the pressure-sensitive adhesive sheet 1 by using the acrylic adhesive composition.

(Preparation of Pressure-Sensitive Adhesive Sheet 4)

0.05 wt part of "Irgacure 651" (manufactured by Ciba Specialty Chemicals Corporation) and 0.05 wt part of "Irgacure 184" (manufactured by Ciba Specialty Chemicals Corporation) were blended as photopolymerization initiators with 100 wt parts of butyl acrylate as monomer component; and the mixture was irradiated with ultraviolet ray until the viscosity (BH viscometer, No. 5 rotor, 10 rpm, temperature: 30° C.) reached approximately 15 Pa·s to give a partial polymer (sirup D) which is partially polymerized.

0.08 wt part of hexanediol diacrylate was added to 100 wt parts of the partial polymer (sirup D) thus obtained, and the mixture was agitated uniformly to give an acrylic adhesive composition.

A pressure-sensitive adhesive sheet 4 was prepared in a manner similar to the pressure-sensitive adhesive sheet 1, by using the acrylic adhesive composition.

(Preparation of Pressure-Sensitive Adhesive Sheet 5)

0.05 wt part of ("Irgacure 651" (manufactured by Ciba Specialty Chemicals Corporation) and 0.05 wt part of "Irgacure 184" (manufactured by Ciba Specialty Chemicals Corporation) were blended as photopolymerization initiators with a monomer mixture containing 90 wt parts of butyl acrylate and 10 wt parts of acrylic acid as monomer components; the mixture was irradiated with ultraviolet ray until the viscosity (BH viscometer, No. 5 rotor, 10 rpm, temperature: 30° C.) reached approximately 15 Pa·s to give a partial polymer (sirup E) which is partially polymerized.

0.08 wt part of hexanediol diacrylate was added to 100 wt parts of the partial polymer (sirup E) thus obtained, and the mixture was agitated uniformly, to give an acrylic adhesive composition.

A pressure-sensitive adhesive sheet 5 was prepared in a manner similar to the pressure-sensitive adhesive sheet 1, by using the acrylic adhesive composition.

It was possible to form a pressure-sensitive adhesive layer additionally on the side of each pressure-sensitive adhesive sheet 1 to 5 opposite to the pressure-sensitive adhesive layer formed, by a method similar to that used in forming the pressure-sensitive adhesive layer, and thus to give a double-faced pressure-sensitive adhesive sheet. The pressure-sensitive adhesive sheets 1 to 5 with a pressure-sensitive adhesive layer only on one side were used in the Examples and Comparative Examples below.

(Adherend A)

A solution of an acrylic oligomer-based surface control agent 1 ("DISPARLON LF1984", manufactured by Kusumoto Chemicals, Ltd.) in ethyl acetate, which was adjusted to a solid matter concentration of 0.5%, was spin-coated on a polypropylene (PP) plate (rotational frequency: 1000 rpm, rotation period: 10 seconds) and dried at 130° C. for 5 minutes to give an adherend A.

(Adherend B)

An adherend B was prepared in a manner similar to the adherend A, except that the surface control agent was changed to an acrylic oligomer-based surface control agent 2 ("DISPARLON LF1983", manufactured by Kusumoto Chemicals, Ltd.).

(Calculation of Solubility Parameter (SP Value))

The SP values of the pressure-sensitive adhesive layers of the pressure-sensitive adhesive sheets 1 to 5 and the surface control agents 1 and 2 are summarized in Table 1.

In the case of the pressure-sensitive adhesive layer, SP values of the compounds having a content of 1 wt % or more in the pressure-sensitive adhesive layer (after curing) were calculated according to the Fedors' Formula. In the case of polymers (such as acrylic polymers), SP values only of monomer units contained in an amount of 1 wt % or more in the pressure-sensitive adhesive layer were calculated.

For example in the case of acrylic adhesives, the SP values were calculated based on the acrylic polymer (monomer unit), the crosslinking agent, and various additives (only organic matters having a content of 1 wt % or more). The solvent, which does not constitute the pressure-sensitive adhesive layer as evaporated after curing, was not used for SP value calculation.

The SP value is, in principle, calculated based on the blending composition of the adhesive composition (initially formulated composition), but when the blending composition is unknown, it can be calculated based on the results of chemical composition analysis, for example by NMR, of the pressure-sensitive adhesive layer after curing.

The solid matter composition of the surface control agent was determined by using NMR ("JNM-EX400", manufactured by JEOL Ltd.) and the SP value was calculated according to the Fedors Formula.

TABLE 1

| | Solubility parameter (SP value) $(cal/cm^3)^{1/2}$ |
|---|---|
| Pressure-sensitive adhesive sheet 1 | 9.60 |
| Pressure-sensitive adhesive sheet 2 | 9.22 |
| Pressure-sensitive adhesive sheet 3 | 9.47 |
| Pressure-sensitive adhesive sheet 4 | 9.77 |
| Pressure-sensitive adhesive sheet 5 | 10.13 |
| Acrylic oligomer-based surface adjuster 1 | 9.67 |
| Acrylic oligomer-based surface adjuster 2 | 9.22 |

For example, the SP value of the pressure-sensitive adhesive sheet 1 above was calculated from the two components: the 2-ethylhexyl acrylate (2EHA) monomer unit and the acrylic acid (AA) monomer unit contained in the pressure-sensitive adhesive layer after curing in an amount of 1 wt % or more.

The SP value was calculated from the molar ratio of the 2EHA monomer unit to the AA monomer unit (2EHA/AA=78/22) and the energy of vaporization and the molar volume of each atom group shown in Table 2 (values described in "SP Value: Basis, Application, and Calculation Method" were used).

TABLE 2

| Atom group | Energy of vaporization of each atom group J/mol | Molar volume of each atom group $cm^3$/mol |
|---|---|---|
| —$CH_3$ | 4710 | 33.5 |
| —$CH_2$— | 4940 | 16.1 |
| —CH< | 3430 | −1 |
| —COOH | 27630 | 28.5 |
| —COO— | 18000 | 18 |

(Measurement of Adhesive Strength to PP Plate)

A strip-shaped sample of 25 mm in width and 80 mm in length was cut off from each of the pressure-sensitive adhesive sheets 1 to 5 obtained above.

The strip-shaped pressure-sensitive adhesive sheet was bonded to a PP plate (not coated with surface control agent) previously washed with methanol solution, as pressed with one sweep of a 2-kg rubber roller (roller width: 45 mm). After storage of the sheet for 1 hour under the condition of 23° C. and 50% RH, the test piece was subjected to a 180° peel test (tensile speed: 100 mm/minute) according to MS Z-0237 by using a tensile tester ("AG-20kNG", manufactured by Shimadzu Corporation), to determine the adhesive strength (N/25 mm) to the PP plate. Results are summarized in Table 3.

TABLE 3

| | Adhesive strength to PP plate (N/25 mm) |
|---|---|
| Pressure-sensitive adhesive sheet 1 | 8.8 |
| Pressure-sensitive adhesive sheet 2 | 1.1 |
| Pressure-sensitive adhesive sheet 3 | 5.2 |
| Pressure-sensitive adhesive sheet 4 | 0.5 |
| Pressure-sensitive adhesive sheet 5 | 6.2 |

Example 1

A strip-shaped sample of 25 mm in width and 80 mm in length was cut off from the pressure-sensitive adhesive sheet 1.

The strip-shaped pressure-sensitive adhesive sheet was bonded to the surface control agent-coated surface of the adherend A, as pressed with one sweep of a 2-kg rubber roller, in a manner similar to the adhesive strength measurement to the PP plate above.

The test piece was subjected to a 180° peel test, in a manner similar to the measurement of the adhesive strength to PP plate, for measurement of the adhesive strength between the pressure-sensitive adhesive sheet 1 and the adherend A. Results are summarized in Table 4.

The adhesion rate was determined by the following calculation formula. Results are summarized in Table 4.

Adhesion rate(%)=(Adhesive strength to surface control agent-coated surface)/(Adhesive strength to PP plate)×100

The adhesion rate represents the magnitude of the influence by the surface control agent.

Examples 2 to 9 and Comparative Example 1

As shown in Table 4, the adhesive strength and the adhesion rate were determined, while the combination of the pressure-sensitive adhesive sheet and the adherend was altered.

The results of adhesiveness to the adherends A and B represent the adhesiveness to the vehicle coating face containing a surface control agent as model.

TABLE 4

|  | Pressure-sensitive adhesive sheet | Adherend | Difference in SP value (absolute value) (cal/cm³)^(1/2) | Adhesive Strength (N/25 mm) | | Adhesion rate (%) |
|---|---|---|---|---|---|---|
|  |  |  |  | PP plate | Surface control agent-coated surface |  |
| Example 1 | Pressure-sensitive adhesive sheet 1 | Adherend A | 0.07 | 8.8 | 8.3 | 94 |
| Example 2 | Pressure-sensitive adhesive sheet 1 | Adherend B | 0.38 | 8.8 | 6.2 | 70 |
| Example 3 | Pressure-sensitive adhesive sheet 2 | Adherend A | 0.45 | 1.1 | 0.8 | 73 |
| Example 4 | Pressure-sensitive adhesive sheet 2 | Adherend B | 0.00 | 1.1 | 1.2 | 109 |
| Example 5 | Pressure-sensitive adhesive sheet 3 | Adherend A | 0.20 | 5.2 | 4.8 | 92 |
| Example 6 | Pressure-sensitive adhesive sheet 3 | Adherend B | 0.25 | 5.2 | 4.3 | 83 |
| Example 7 | Pressure-sensitive adhesive sheet 4 | Adherend A | 0.10 | 0.5 | 0.4 | 80 |
| Example 8 | Pressure-sensitive adhesive sheet 4 | Adherend B | 0.55 | 0.5 | 0.4 | 80 |
| Example 9 | Pressure-sensitive adhesive sheet 5 | Adherend A | 0.46 | 6.2 | 4.4 | 71 |
| Comparative Example 1 | Pressure-sensitive adhesive sheet 5 | Adherend B | 0.91 | 6.2 | 2.0 | 32 |

As obvious also from Table 4, if a combination of a surface control agent and a pressure-sensitive adhesive layer having a difference in SP value between them in the range according to the present invention is used, the adhesion rate is higher even to the surface of a hardly adhesive vehicle coating containing a surface control agent on the surface (such as automotive coating face), the influence by the surface control agent is smaller, and preferable adhesiveness is obtained.

INDUSTRIAL APPLICABILITY

The present invention, which relates to a method of adhering a pressure-sensitive adhesive sheet onto the surface (coated surface) of a vehicle coating such as automotive coating, is used, for example, for protection of the surface of automotive coatings.

What is claimed is:

1. A method of adhering a pressure-sensitive adhesive sheet for vehicle coatings containing a surface control agent, comprising the step of adhering the pressure-sensitive adhesive sheet onto coated surface of the vehicle coatings, characterized in that the difference (absolute value) between the solubility parameter (SP value) of a pressure-sensitive adhesive layer (X) formed on the side of the pressure-sensitive adhesive sheet in contact with the vehicle coating and the solubility parameter (SP value) of the surface control agent contained in the vehicle coating is 0.6 (cal/cm³)^(1/2) or less, wherein the pressure-sensitive adhesive layer (X) is formed by curing an acrylic adhesive composition containing a vinyl monomer containing an alkyl (meth)acrylate (a1) having an alkyl group containing 2 to 14 carbon atoms as the principal component or a partial polymer thereof (a), a photopolymerization initiator b and a multifunctional (meth)acrylate (c) by irradiation with active energy ray, wherein the alkyl (meth)acrylate (a1) is contained in an amount of 60 wt % or more with respect to the sum of all monomer components of the vinyl monomer.

2. The method of adhering a pressure-sensitive adhesive sheet for vehicle coatings according to claim 1, wherein the pressure-sensitive adhesive sheet is an automotive coating-protecting sheet and the method is used for protection of the surface of an automotive coating.

3. The method of adhering a pressure-sensitive adhesive sheet for vehicle coatings according to claim 2, wherein the pressure-sensitive adhesive sheet has a viscoelastic layer (Y) containing hollow microspheres.

4. The method of adhering a pressure-sensitive adhesive sheet for vehicle coatings according to claim 2, wherein the surface control agent is an acrylic oligomer having a number-average molecular weight of 4000 to 30000.

5. The method of adhering a pressure-sensitive adhesive sheet for vehicle coatings according to claim 3, wherein the surface control agent is an acrylic oligomer having a number-average molecular weight of 4000 to 30000.

6. The method of adhering a pressure-sensitive adhesive sheet for vehicle coatings according to claim 1, wherein the pressure-sensitive adhesive sheet has a viscoelastic layer (Y) containing hollow microspheres.

7. The method of adhering a pressure-sensitive adhesive sheet for vehicle coatings according to claim 6, wherein the surface control agent is an acrylic oligomer having a number-average molecular weight of 4000 to 30000.

8. The method of adhering a pressure-sensitive adhesive sheet for vehicle coatings according to claim 1, wherein the surface control agent is an acrylic oligomer having a number-average molecular weight of 4000 to 30000.

* * * * *